(12) United States Patent
Amiel

(10) Patent No.: US 8,813,256 B2
(45) Date of Patent: Aug. 19, 2014

(54) REGULATOR OF COMMANDS WHICH ARE DESTINED FOR A SENSITIVE APPLICATION

(75) Inventor: Patrice Amiel, Les Milles (FR)

(73) Assignee: Gemalto SA, Meudon (FR)

( * ) Notice: Subject to any disclaimer, the term of this patent is extended or adjusted under 35 U.S.C. 154(b) by 230 days.

(21) Appl. No.: 13/120,669

(22) PCT Filed: Aug. 27, 2009

(86) PCT No.: PCT/EP2009/061065
§ 371 (c)(1),
(2), (4) Date: Mar. 24, 2011

(87) PCT Pub. No.: WO2010/037605
PCT Pub. Date: Apr. 8, 2010

(65) Prior Publication Data
US 2011/0185438 A1     Jul. 28, 2011

(30) Foreign Application Priority Data
Sep. 30, 2008   (EP) .................................... 08305625

(51) Int. Cl.
*G06F 7/04*       (2006.01)
*G06F 17/30*      (2006.01)
*H04N 7/16*       (2011.01)
*G07F 7/08*       (2006.01)
*G06Q 20/34*      (2012.01)

(52) U.S. Cl.
CPC ................ *G07F 7/08* (2013.01); *G06Q 20/341* (2013.01)
USPC .......................................................... 726/30

(58) Field of Classification Search
CPC ....................................................... G06F 21/12

USPC ............................................................. 726/30
See application file for complete search history.

(56) References Cited

U.S. PATENT DOCUMENTS

| 7,505,451 B2 * | 3/2009 | Hashizume et al. .......... 370/352 |
| 7,877,791 B2 * | 1/2011 | Childress et al. ................. 726/5 |
| 7,913,300 B1 * | 3/2011 | Flank et al. ..................... 726/12 |
| 8,307,406 B1 * | 11/2012 | Aboujaoude et al. ............. 726/2 |

FOREIGN PATENT DOCUMENTS

| JP | 2001-195266 A | 7/2001 |
| JP | 2003-518279 A | 6/2003 |
| JP | 2004-530968 A | 10/2004 |
| JP | 2007-526573 A | 9/2007 |
| WO | 00/45262 A2 | 8/2000 |
| WO | 02/061553 A1 | 8/2002 |
| WO | 2005/086000 A2 | 9/2005 |

OTHER PUBLICATIONS

International Search Report (PCT/ISA/210) issued on Jan. 25, 2010, by European Patent Office as the International Searching Authority for International Application No. PCT/EP2009/061065.

(Continued)

*Primary Examiner* — Dant Shaifer Harriman
(74) *Attorney, Agent, or Firm* — Buchanan Ingersoll & Rooney

(57) ABSTRACT

The present invention describes a method and a software module making it possible to secure communications with a sensitive application, for which exchanges with the outside have been delegated to a so-called interfacing application. Accordingly, the present invention describes the application of security rules to all or some of the commands destined for this sensitive application.

14 Claims, 2 Drawing Sheets

(56) References Cited

OTHER PUBLICATIONS

Written Opinion (PCT/ISA/237) issued on Jan. 25, 2010, by European Patent Office as the International Searching Authority for International Application No. PCT/EP2009/061065.

William Stallings, "Cryptography and Network Security: Principles and Practice", Chapter 16, Firewalls, 1999, pp. 517-532, XP-002536035, Prentice-Hall, Inc., USA.

An English Translation of the Office Action (Notice of Reasons for Rejection) dated Jul. 10, 2012, issued in corresponding Japanese Patent Application No. 2011-528276. (3 pages).

* cited by examiner

REGULATOR OF COMMANDS WHICH ARE DESTINED FOR A SENSITIVE APPLICATION

The invention relates to a regulator of commands destined for a sensitive application.

More particularly, the invention relates to a method destined for centralising, analysing and filtering commands destined for a sensitive application in a multi-application device.

Today, an increasing part of mobile electronic devices are multi-application ones.

This trend can be more particularly observed in the field of mobile telephones which host, in addition to the telephone application proper, GPS applications, internet browsing applications, etc.

Similarly, electronic devices such as chip cards are more and more requested to host different applications. Cards hosting a banking application, a loyalty application, each one belonging to a different company, can easily be found, and applications embedded by the card user himself/herself often co-exist too.

In the particular field of contactless mobile payment, also called NFC for "Near Field Communication" mobile payment, an electronic device such as a telephone, hosts a security electronic module such as a chip card. In order to enable the wireless payment with the phone, a banking application is hosted by the chip card, and a so-called user interface application can be hosted by the telephone or the chip card, for example as a Midlet. The banking application is most often a certified and protected application having an extremely well-defined input and output format. Then, the most current method for "adapting" this type of applications without modifying these (re-certification issue) consists in developing a so-called interfacing application which serves as a relay with the equipment (keyboard, screen). This so-called interfacing application is the favourite location for installing security and restriction elements destined for protecting the utilisation of the banking application.

Then, the normal communication track to the banking application is through the user interface application. This diagram is also applied to all the fields for which it is desired to dissociate one application and the communication interface thereof.

The risks entailed in this model are that a malevolent user or programme could directly converse with the banking application and thus bypass the security elements installed in the so-called interfacing application.

A solution may consist in identifying the client sending a command. To be efficient, this identity check must be carried out at the application proper and be adapted to the electronic device whereon the application is implemented. In the present context of banking applications which are certified and thus can be modified with difficulty, this solution does not make it possible to supply a generic solution.

Similarly, the security of access to the banking application may be assigned to the electronic device which hosts the security electronic module. This solution has two major drawbacks:
- the electronic device is not a secured environment and, in most cases, it does not belong to the company supplying the banking application contained in the security electronic module. For example, this is the case where the electronic device is a portable telephone and the security module is a chip card supplied by a banking operator.
- this solution does not make it possible to protect the banking application against a malevolent action from another application hosted by the security electronic module. This application can be loaded into the module without the user knowing it (Trojan horse).

The present invention provides to secure the access to a sensitive application hosted in an electronic device in an interoperable manner and without modifying the sensitive application.

Therefore, the present invention is first a method for securing accesses to a sensitive application hosted in an electronic device, in a system including said sensitive application, and a so-called interfacing application in charge of the exchanges between said sensitive application and the outside, this method including the following steps:
- centralisation of all the commands destined for the sensitive application
- analysis of commands destined for the sensitive application
- application to each one of the commands destined for the sensitive application of at least one security rule.

According to one embodiment, the step of centralisation of all the commands destined for the sensitive application can be executed at the operating system of the electronic device.

Similarly, the step of analysis of said commands destined for said sensitive application can be carried out at the operating system of the electronic device.

The step of application to each one of the commands destined for the sensitive application of at least one security rule can also be executed at the operating system of the electronic device.

The security rules according to the invention can for example consist in rejecting the commands destined for the sensitive application coming from the outside of the electronic device, or for example consist in rejecting a command destined for the sensitive application not coming from an application belonging to the same security domain as the sensitive application.

In one embodiment, the security rules according to the invention may rely on the nature of the command destined for the sensitive application and thus reject the commands the nature of which does not belong to a list recorded in the memory of the electronic device, or, a contrario, reject the commands destined for said sensitive application the nature of which belongs to a list recorded in a memory of said electronic device.

According to one embodiment, the security rules combine several criteria for rejecting said commands destined for the sensitive application.

Secondly, the present invention is also a software module recorded in the memory of an electronic device including at least one memory and one processor intended for protecting the access to a sensitive application stored in the memory of an electronic device, with this software module having means for:
- centralising all the commands destined for the sensitive application,
- analysing, using a processor of the electronic device, the commands destined for the sensitive application,
- reading at least one security rule in a memory of said electronic device,
- applying to each one of the commands destined for the sensitive application at least one security rule.

This software module may be integrated into the operating system of the electronic device.

The software module according to the invention may use security rules, for example consisting in rejecting the commands destined for the sensitive application coming from the outside of the electronic device, or consisting in rejecting said commands destined for the sensitive application, not coming from an application belonging to the same security domain as said sensitive application.

In one embodiment, the software module according to the invention can apply security rules based on the nature of the command destined for the sensitive application and thus reject the commands the nature of which does not belong to the list recorded in a memory of the electronic device or, a contrario, reject the commands destined for said sensitive application the nature of which belongs to a list recorded in a memory of said electronic device.

The software module according to the invention may also combine several criteria for rejecting the commands destined for the sensitive application.

Other characteristics and advantages of the invention will clearly appear from the description given hereinafter as an indication and not as a limitation, while referring to the appended drawings wherein.

Figure 1:
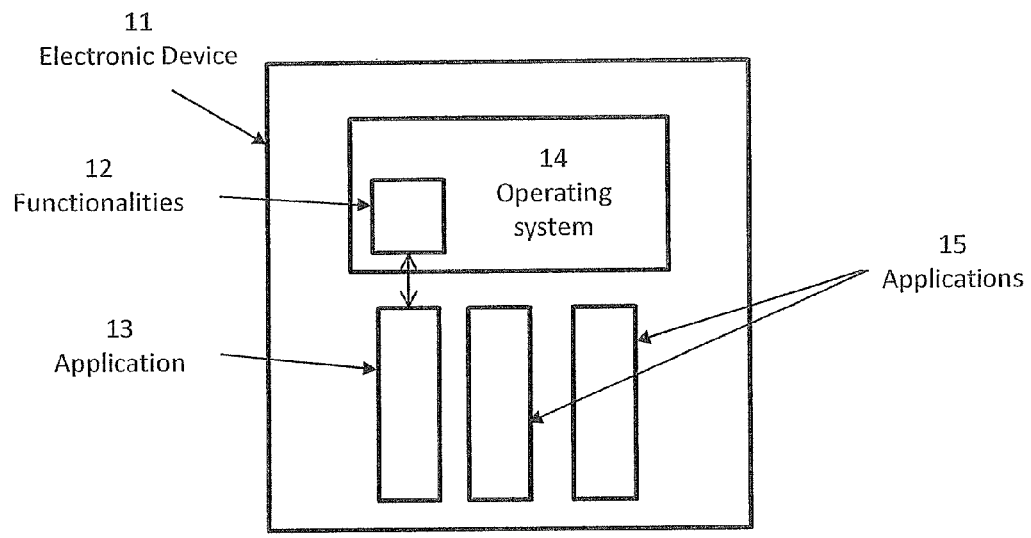
FIG. 1 shows an exemplary implementation of the invention in an electronic device including several applications, and a sensitive application the accesses of which must be protected.

In FIG. 1, an electronic device 11, which may for example be a chip card, contains an operating system 14 and three distinct applications 13 and 15.

In this exemplary embodiment, the application 13 is considered as sensitive and the accesses thereto must be protected. For this purpose, an assembly of functionalities 12 is added to the operating system 14 in order to centralise and regulate the attempted accesses to such an application.

Figure 2:
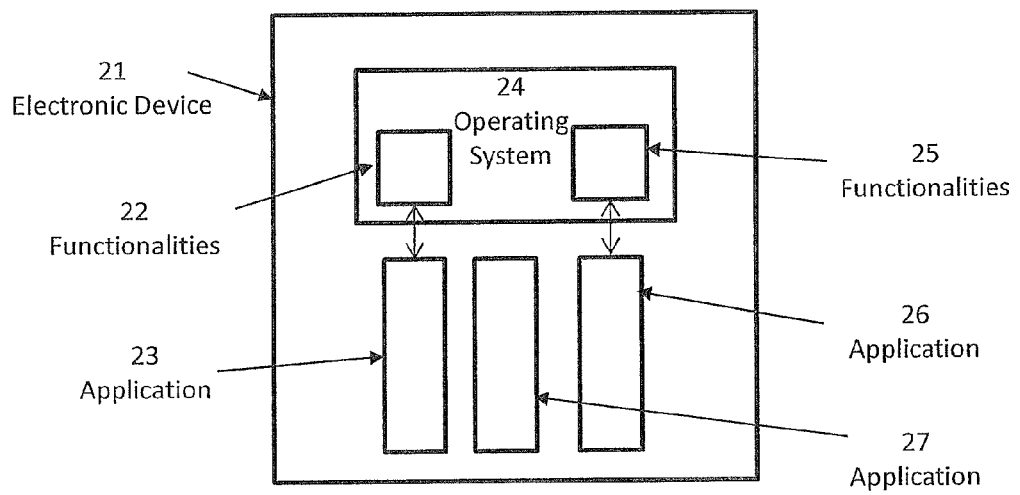
FIG. 2 illustrates an exemplary implementation of the invention in an electronic device including several applications and two independent sensitive applications the accesses of which must be protected.

FIG. 2 illustrates an implementation similar to that of FIG. 1, with the electronic device 21, the operating system 24 and the applications 23, 26, 27. However, these examples show us the case where two applications 23 and 26 contained in the device 21 are sensitive. It may be considered to add only one assembly of functionalities 22 which would manage the accesses to both applications. This case would be particularly adapted to the case where both applications have common interests, for example have been provided by the same company.

However, FIG. 2 shows the case where both applications are independent and thus each have their own additional functionalities 22, 25 added to the operating system. This particular implementation makes it possible to guarantee the owners of each one of the applications 22 and 26 that the security thereof and the management of accesses thereto are executed within the safest conditions. In addition, this would enable each one of the applications to have totally different policies of management of the access thereto.

Figure 3:
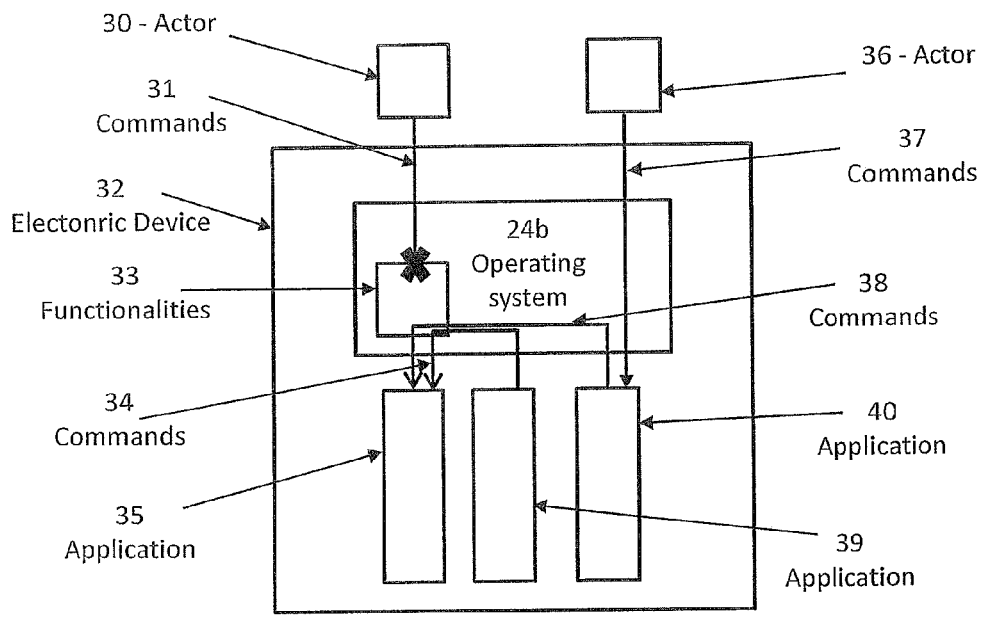
FIG. 3 shows the operation of a device including an application protected by the present invention the accesses of which have been assigned to a so-called interfacing application.

FIG. 3 shows the operation of a device implementing the present invention. In addition to the electronic device 32, the figure shows two external actors 30 and 36. These actors may be users or communicating electronic devices such as for example computer servers.

In this figure, the device contains 3 distinct applications, with the application 35 being a sensitive application the accesses thereof having been assigned to the so-called interfacing application 39. This so-called interfacing application 39 may for example be a user interface (UI).

In the case illustrated in FIG. 3, an assembly of functionalities 33 according to the invention has been added to the operating system 24b.

These functionalities will make it possible to centralise the assembly of commands 31, 38 and 34 destined for a sensitive application 35. Once these commands are analysed, security rules are applied. In the example illustrated here, such rules prohibit any access to the sensitive application 35 from the outside.

Then, the actor 30 realizes that the command 33 is rejected by the invention 33. On the contrary, the commands 37 sent by the actor outside the so-called interfacing application 39 is relayed to the sensitive application and, as it complies with the security rules, is accepted by the invention.

The application of such security rules makes it possible for the application 40 to send commands 34 to the sensitive application.

In the case of a stricter implementation as regards security, security rules could let through only the commands from the so-called interfacing application. In this embodiment, only the relayed 34 commands 37 could have access to the sensitive application 35. The commands 31 and 34 would be denied access.

Figure 4:
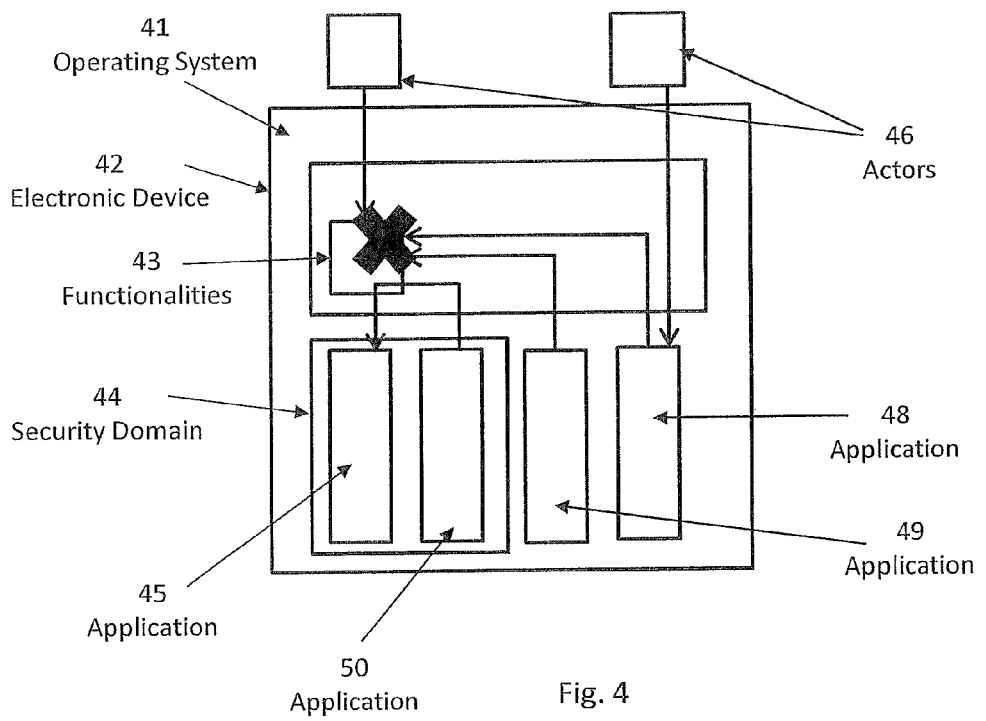
FIG. 4 shows the operation of a device including an application protected by the present invention the accesses of which are limited to some internal applications.

FIG. 4 illustrates the operation of a device 42 hosting an operating system 41, and four applications 45, 48, 49 and 50.

The functionalities 43 added to the operating system according to the invention apply a security rule prohibiting any access to the secured application 45 from the outside of the electronic device.

Thus, the actors outside 46 realize that their direct commands are rejected.

A second rule is combined with the preceding one and prohibits the access to the sensitive application 45 by any application which does not belong to the same security domain 44 as that of the application 45. The term security domain is frequently used in the multiple application electronic devices such as for example the chip cards implementing the GP (Global Platform) system. This second rule prohibits the sending of any command from the applications 48 and 49. Then, an actor outside which would have downloaded an application, for example 48, into the device, would not be able to use it as a gateway for reaching the application 45.

On the contrary, the application 50 will have the function of the so-called interfacing application as it will be the only one to comply with all the security rules.

In a preferred embodiment of the invention, a mechanism makes it possible to update the security rules from an outside source.

In a particular embodiment, the different functionalities of the invention may be distributed in the electronic device. An example of such an implementation consists in:
 implementing the step of centralisation of the commands destined for the sensitive application to be protected inside the operating system,
 such commands can be sent to an application of the electronic device which would be in charge of the analysis thereof,
 the application of the security rules would be carried out by another application.

This typical implementation enables a large modularity since every one of the applications can have its own updating, enhancement mechanism, etc.

This type of implementation also gives a greater flexibility in the implementation of the invention since it makes it possible to install each application as a function of the mechanisms contained in and the capacities of the device.

The invention claimed is:

1. A method for securing the access to a sensitive application hosted in an electronic device, in a system including said sensitive application and an interfacing application in charge of the exchanges between said sensitive application and the outside, wherein the method includes the following steps:
    centralisation of all commands destined for said sensitive application,
    analysis of said commands destined for said sensitive application, and
    application to each of said commands destined for said sensitive application of at least one security rule, wherein said at least one security rule is based on requirements for applications within said electronic device from which commands, destined for said sensitive application, originate.

2. A method according to claim 1, wherein said step of centralisation of all the commands destined for said sensitive application is executed at the operating system of said electronic device.

3. A method according to claim 1, wherein said step of analysis of said commands destined for said sensitive application is executed at the operating system of said electronic device.

4. A method according to claim 1, wherein said step of application to each one of said commands destined for said sensitive application of at least one security rule is executed at the operating system of said electronic device.

5. A method according to claim 1, wherein said security rule comprises rejecting said commands destined for said sensitive application, not coming from an application belonging to the same security domain as said sensitive application.

6. A method according to claim 1, wherein said security rule comprises rejecting said commands destined for said sensitive application if the nature thereof does not belong to an explicit list recorded in a memory of said electronic device.

7. A method according to claim 1, wherein said security rule comprises rejecting said commands destined for said sensitive application if the nature thereof belongs to a list recorded in a memory of said electronic device.

8. A method according to claim 1, wherein the security rules comprises combining several criteria for rejecting said commands destined for said sensitive application.

9. A software module recorded in a memory of an electronic device including at least one memory and one processor destined for protecting the access to one sensitive application stored in a memory of said electronic device, wherein the software module includes means for:
    centralising all commands destined for said sensitive application,
    analysing, with the processor of said electronic device, said commands destined for said sensitive application,
    reading at least one security rule in a memory of said electronic device, and
    applying, to each one of said commands destined for said sensitive application, said at least one security rule, wherein said at least one security rule is based on requirements for applications within said electronic device from which commands, destined for said sensitive application, originate.

10. A software module according to claim 9, wherein the software module is integrated in an operating system of said electronic device.

11. A software module according to claim 9, wherein said security rule comprises rejecting said commands destined for said sensitive application, not coming from an application belonging to the same security domain as said sensitive application.

12. A software module according to claim 9, wherein said security rule comprises rejecting said commands destined for said sensitive application if the nature thereof does not belong to an explicit list recorded in the memory of said electronic device.

13. A software module according to claim 9, wherein said security rule comprises rejecting said commands destined for said sensitive application if the nature thereof belongs to a list recorded in a memory of said electronic device.

14. A software module according to claim 9, wherein said security rules comprises combining several criteria for rejecting said commands destined for said sensitive application.

* * * * *